US009297466B2

(12) United States Patent
van Eijk

(10) Patent No.: US 9,297,466 B2
(45) Date of Patent: Mar. 29, 2016

(54) SAFETY SYSTEM FOR DANGEROUS SUBSTANCES

(75) Inventor: Marinus van Eijk, Woerden (NL)

(73) Assignee: VORSCON HOLDING B.V., Woerden (NL)

( * ) Notice: Subject to any disclaimer, the term of this patent is extended or adjusted under 35 U.S.C. 154(b) by 193 days.

(21) Appl. No.: 14/119,592

(22) PCT Filed: May 23, 2011

(86) PCT No.: PCT/NL2011/050347
§ 371 (c)(1),
(2), (4) Date: Mar. 3, 2014

(87) PCT Pub. No.: WO2011/145943
PCT Pub. Date: Nov. 24, 2011

(65) Prior Publication Data
US 2014/0318635 A1 Oct. 30, 2014

(51) Int. Cl.
*F16K 17/00* (2006.01)
*E21B 33/12* (2006.01)
*F16L 55/103* (2006.01)
*E21B 33/06* (2006.01)
*E21B 36/00* (2006.01)

(52) U.S. Cl.
CPC ............... *F16K 17/00* (2013.01); *E21B 33/06* (2013.01); *E21B 33/12* (2013.01); *E21B 36/001* (2013.01); *F16L 55/103* (2013.01); *Y10T 137/0391* (2015.04); *Y10T 137/6416* (2015.04)

(58) Field of Classification Search
CPC ......... E21B 33/00; E21B 33/12; E21B 33/06; E21B 36/001; F16L 13/10; F16L 55/103; F16K 49/00; F16K 17/00
USPC .............................................. 137/13, 340, 828
See application file for complete search history.

(56) References Cited

U.S. PATENT DOCUMENTS

| 2,552,901 | A | | 5/1951 | Miller |
| 3,738,424 | A | | 6/1973 | Osmun et al. |
| 3,857,255 | A | | 12/1974 | Elwood et al. |
| 3,885,629 | A | | 5/1975 | Erb |
| 4,203,472 | A | | 5/1980 | Dulaney |
| 4,372,378 | A | | 2/1983 | Powers, Jr. |
| 4,396,031 | A | | 8/1983 | Peterson et al. |
| 5,125,427 | A | | 6/1992 | Cantu et al. |
| 5,649,594 | A | | 7/1997 | Flak et al. |
| 5,988,197 | A | * | 11/1999 | Colin et al. ..................... 137/13 |
| 6,141,972 | A | * | 11/2000 | Evans ............................ 62/50.2 |

FOREIGN PATENT DOCUMENTS

GB 1601462 A 10/1981

* cited by examiner

*Primary Examiner* — Kevin Lee
(74) *Attorney, Agent, or Firm* — Hoffmann & Baron, LLP

(57) ABSTRACT

An improved safety device, for oil and gas installations, includes one or more conduits for the transport of oil and/or gas, and one or more valves, where the safety system includes a freezing device, which can be provided substantially around a conduit and/or a valve, where the freezing device cools the conduit and/or valve in such a way, preferably by using liquid nitrogen of freon, that the medium in the conduit and/or the valve freezes.

26 Claims, 8 Drawing Sheets

SAFETY SYSTEM FOR DANGEROUS SUBSTANCES

CROSS-REFERENCE TO RELATED APPLICATIONS

This application is the National Stage of International Application No. PCT/NL2011/050347 filed May 23, 2011, the contents of which is incorporated by reference herein.

FIELD OF THE INVENTION

The present invention relates to a safety system for inflammable substances in particular to oil and gas installations.

BACKGROUND OF THE INVENTION

The commonly used safety systems have a disadvantage in that the systems stop functioning entirely or partially after an explosion or an earthquake, because essential parts of installations are no longer located in the correct position, as a result of which varies data such as pressure levels, leaks and fire can no longer be observed. A consequence is that the pressure may reach dangerous levels at certain tanks and/or conduits, as a result of which the situation becomes irreversible, which may lead to a disaster with all due consequences. If, after an explosion and/or an earthquake, the fire extinguishing system is also no longer located in the correct position, a fire can spread very rapidly, which may cause a situation to become increasingly dangerous and more difficult to control with every minute. In most circumstances, the supply of dangerous substances can no longer be stopped, because certain valves no longer function and/or are no longer within reach because of the chaos. This may also apply to installations which are provided at great depths under water. If the supply of gas or oil by the existing safety systems cannot be stopped in time, this may lead to an environmental disaster, in which the costs to restore damage to the environment, fishing activities and the tourist industry may become enormous.

U.S. Pat. No. 3,738,424 discloses injecting fluid nitrogen in an annulus of a double walled pipe, in order to freeze the pipe and form a plug in the pipe. It was found that the system according to U.S. Pat. No. 3,738,424 is not satisfactory in a number of conditions, which prevents the plug from being created or prevents the plug from being created fast enough.

SUMMARY OF THE INVENTION

The invention has as an objective to provide an improved safety device, wherein burst conduits and/or damaged valves, of which the supply and/or discharge can no longer be stopped, can be closed. This is achieved by providing the installations, such as conduits and valves, with a freezing system at various locations, wherein in use a closing plug is formed by the freezing system in these conduits and valves, thereby stopping the flow of dangerous substances. This formation of a plug in the conduits and/or valves can be attained in various manners, for instance by surrounding the conduits and/or valves with thin conduits, of which an end is coupled to a reservoir holding fluid nitrogen or a similar freezing medium. The thin conduit is provided with small openings on a side, wherein the openings are substantially directed at a surface which is intended to be frozen. When the valve can no longer be closed due to circumstances, for instance by a drop of hydraulic pressure, the medium in the valve can be closed by spraying fluid nitrogen or a similar freezing medium onto the valve. Due to the freezing, an ice plug is created in the valve, which eventually causes the flow of dangerous substances to become stagnated. Alternatively to freezing the conduit and/or valve from the outside, the fluid nitrogen or similar freezing medium can also be sprayed internally into the conduit and/or valve by means of a small conduit. In this embodiment, nitrogen is sprayed into the conduit via a connection, causing the dangerous inflammable substance to be frozen even faster. The connection can be a small connection in the side.

For large conduits and/or valves, the freezing device can combine water and nitrogen. By injecting both water and nitrogen in a certain space via separate conduits, the freezing of the target installations can be performed even faster, as a result of which large openings and/or cracks can also be closed.

This is in particular advantageous when the transported medium in the transport conduit and/or the valve is difficult to freeze, for instance because of a relatively low melting point. The injection of water and/or another frost liquid will improve the formation of a closing plug in such a situation. It is possible that the medium in the conduit or valve does not become frozen itself, but that the closing plug is exclusively formed by the injected water.

This embodiment can also be applied with large tanks and/or ships. When a hole of a vessel becomes damaged due to a collision, the opening in the hole can be closed by means of a freezing device.

In order to warrant the functioning of the freezing device in all circumstances, for instance when conduits and/or valves are damaged due to an earthquake and/or explosion and covered by rubble, the freezing device can be executed entirely sub-surface, preventing the freezing device to become damaged during an explosion and/or earthquake. By providing a network of grids under the installation, from which fluid nitrogen and water coming from reservoirs is injected into certain spaces, the conduits and/or valves which are located therein can eventually be frozen. Because of the fact that fluid nitrogen can be ejected towards the installation from all the small openings, it is possible to freeze certain conduits and/or valves even when they are totally covered with rubble.

During an explosion, installations or parts thereof may be dislocated by hundreds of meters, as a result of which the underground grid will stop functioning. In order to prevent this, conduits and/or valves can be provided with a portable freezing system. By fitting both the conduits and the nitrogen reservoir with a casing which provides protection against heavy explosions, the conduits and/or valves can still be frozen.

In order to improve the safety of the installations even further, the freezing device may be controlled by means of one or more computers. After an explosion the computers may determine from a safe distance which installations need to be frozen and which installations do not need to be frozen on the basis of camera images and/or sensory data of GPS-systems. For instance, a safety device may be provided which is fitted to a conduit and/or valve, and which may be automatically switched on by a computer on the basis of data which is obtained from camera images, GPS-data and/or other data obtained from sensors.

An alternative embodiment on the freezing system is that the conduits and/or valves are frozen with freon, as a result of which the installations are kept frozen for a longer period.

In a further embodiment, the safety device has a first freezing device comprising a sprayer for spraying a freezing medium and a second freezing device comprising a closed conduit system. The first freezing device can be configured to spray liquid nitrogen into and/or around the transport conduit/ valve. In this way, the closing plug may be formed rapidly. However, this requires a continuous supply of fluid nitrogen. In order to maintain the plug, the cooling can be taken over in a later phase by the second freezing device. In this way, the first freezing device can be switched off after a certain amount of time, so as to obviate a continuous use of fluid nitrogen or other freezing medium. With this embodiment the conduit/valve can be efficiently closed for a long period of time. The second, closed freezing device can use freon.

The first freezing device can be configured to spray only a freezing medium into the conduit and/or valve. The first freezing device can also be configured to spray only around the conduit and/or the valve. The first freezing device can also be configured to spray both into the conduit/valve and around the conduit/valve.

The invention is primarily intended for use under water, but can also be used on land. For instance, it is possible for an installation which is provided in the open air to spray a combination of nitrogen and water on the installation. In that case, a lump of ice will be formed around and in the installation and a closing plug will be formed in the conduit and/or valve. Prior to the formation of the ice lump a second freezing device with a closed conduit can be provided to the installation, so as to be able to maintain the ice lump and the plug in the conduit/valve for a long period of time by the freezing device with the closed conduit.

In order to freeze conduits and/or valves with a large diameter, such as a valve of a drilling platform, the freezing device may be provided both on the outside as well as on the inside of the conduit and/or valve. According to this embodiment, a compact freezing device is obtained, when the freezing device is entirely integrated in the conduit.

In order to close conduits having a very high flow velocity, the freezing device can be combined with strong magnets. In this embodiment, a conduit is provided with strong magnets all around and the conduit is coupled to a valve of a reservoir via a thin pipe. The reservoir itself is filled with steel balls. When the valve of the reservoir is opened, the steel balls will roll into the conduit under gravity, and be carried through the conduit in a certain direction by the flow of the medium in the conduit. As soon as the steel balls pass the strong magnets, the balls will remain attached to the wall of the conduit at the location of the magnets, after which the remaining openings in the conduit can be frozen without problems with the nitrogen.

The present invention offers the advantage that the supply and/or discharge of inflammable substances in installations for inflammable substances and in similar installations can be closed under all circumstances. In this way, dangerous situations can be limited even if the entire installation is covered by rubble and/or located at a great depth.

The invention further relates to a transport conduit and/or valve, provided with a safety device according to an embodiment of the present invention.

The invention further relates to a method for closing a transport conduit and/or a valve, in particular of an oil and/or gas installation, by means of a safety device which comprises a freezing device which is configured to spray a freezing medium, the method comprising:
  spraying a freezing medium into the conduit and/or into valve, and/or
  spraying a freezing medium around the conduit and/or valve,
  wherein a closing plug is formed in the conduit and/or valve.

In an embodiment, a frost fluid having a relatively high melting point is also sprayed, causing the closing plug to be primarily formed by the frost fluid.

In an embodiment, the freezing medium comprises fluid nitrogen.

In an embodiment, the frost fluid comprising water.

In an embodiment, a combination of a freezing medium and a frost fluid is sprayed into the conduit and/or valve and only a freezing medium is sprayed around the conduit and/or valve.

In an embodiment, during a first time period a freezing medium is sprayed for the formation of a plug and during a second time period the formed plug is maintained by cooling the plug by means of a second freezing device which comprises a closed conduit system.

In an embodiment the method further comprises positioning the freezing device in the vicinity of the conduit and/of valve after a calamity has occurred.

In an embodiment the freezing device is positioned in the vicinity of a blowout preventer (BOP), wherein:
  a freezing medium is sprayed around the BOP, and
  a freezing medium is injected into the BOP, such that a closing plug is formed in the BOP.

BRIEF DESCRIPTION OF THE DRAWINGS

The invention is further elucidated in view of a number of examples, wherein reference is made to the enclosed drawings, and wherein like reference numerals denote like parts, and in which.

DETAILED DESCRIPTION OF THE INVENTION

Figure 1:
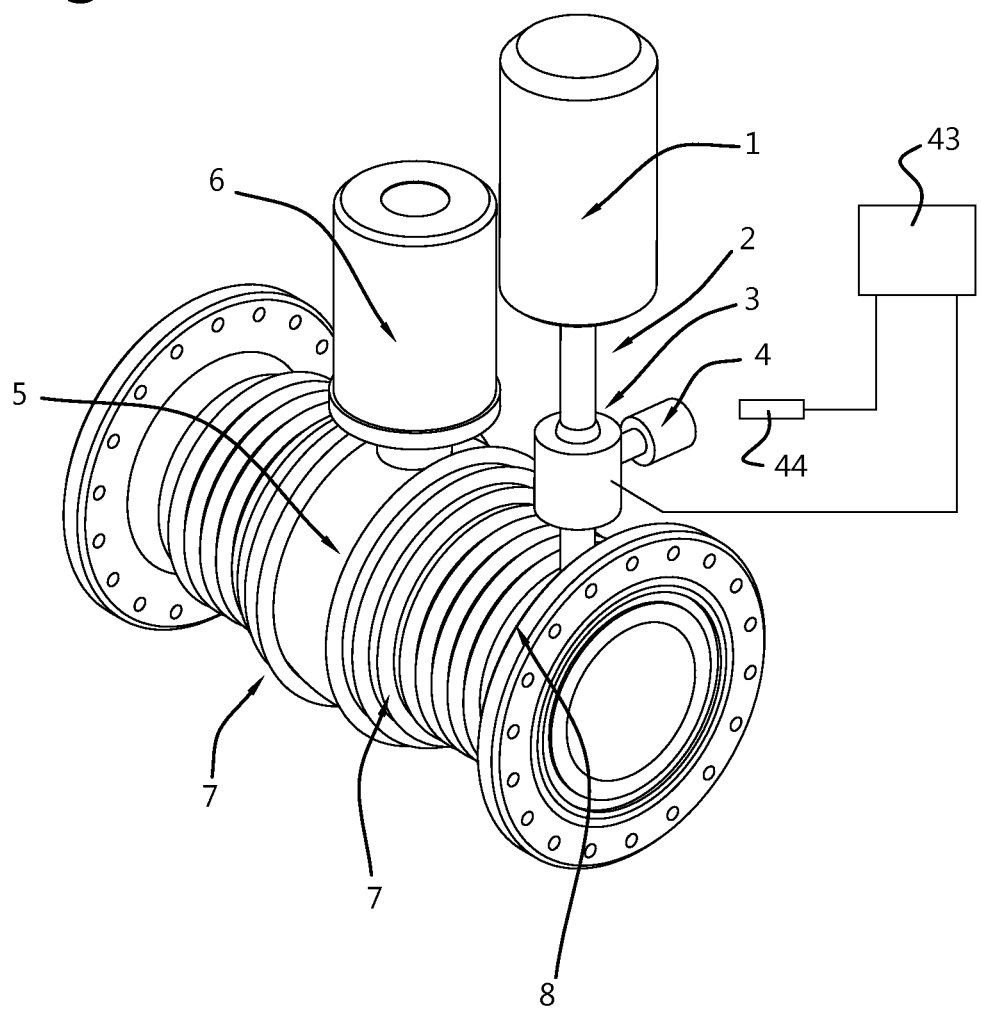
FIG. 1 shows a perspective view of a first embodiment of the freezing device according to the invention, wherein a valve is provided all around with a thin, spirally pipe for the freezing medium.

The improved safety device according to the invention comprises a reservoir 1 for fluid nitrogen, see FIG. 1, wherein the safety device comprises a pipe 2, of which an end 3 is provided with a closable valve 4. Around the outer parameter 5 of the valve 6, a thin conduit (or pipe) 7 is positioned, of which an end is connected with the nitrogen reservoir 1 via the closable valve 4. The thin pipe 7 is further provided with small openings 8, which are substantially directed at the surface of the valve 6. When, due to circumstances, for instance an explosion and/or earthquake, the valve can no longer be closed and/or cracks have occurred at certain points, it is possible that the disaster increases. By opening the valve 4 of the nitrogen reservoir 1, the fluid nitrogen is ejected via the small openings, as a result of which the medium 9 in the valve will freeze and the flow through the valve 6 is stopped.

Figure 2:
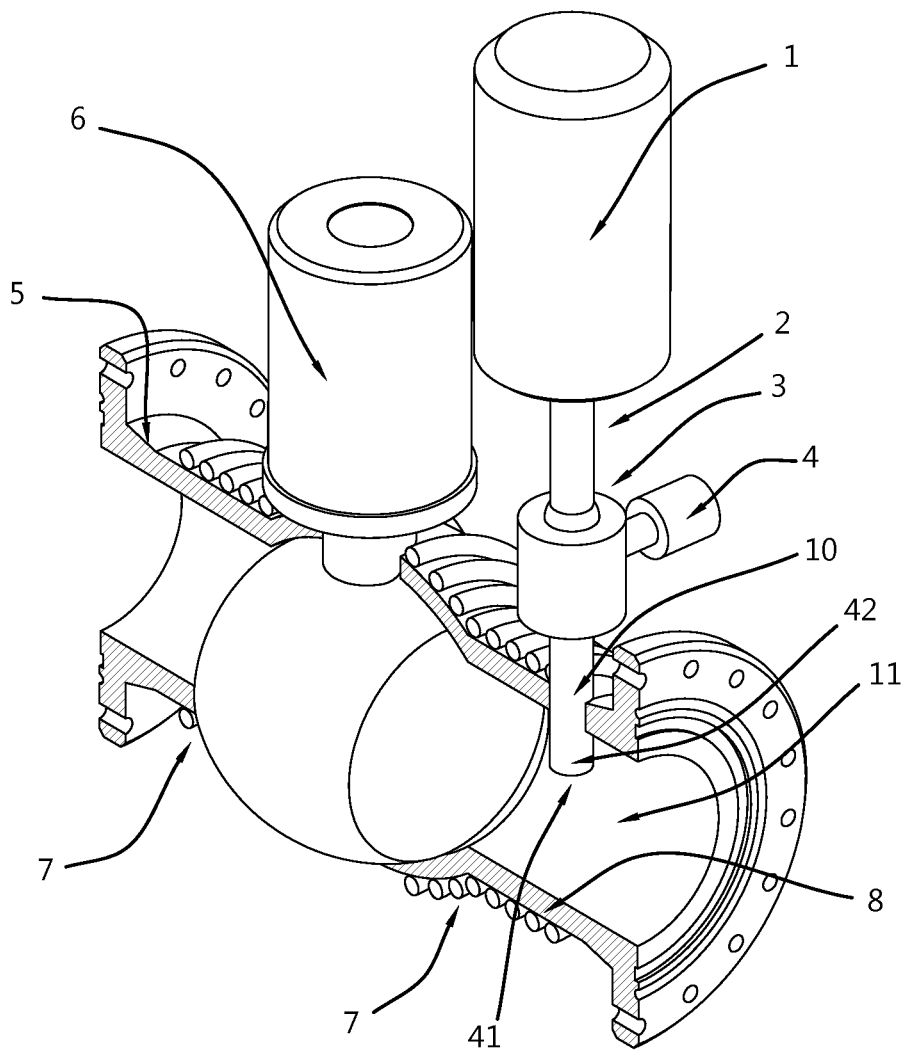
FIG. 2 shows a perspective cross-section of a valve having the freezing device according to FIG. 1.
Figure 3:
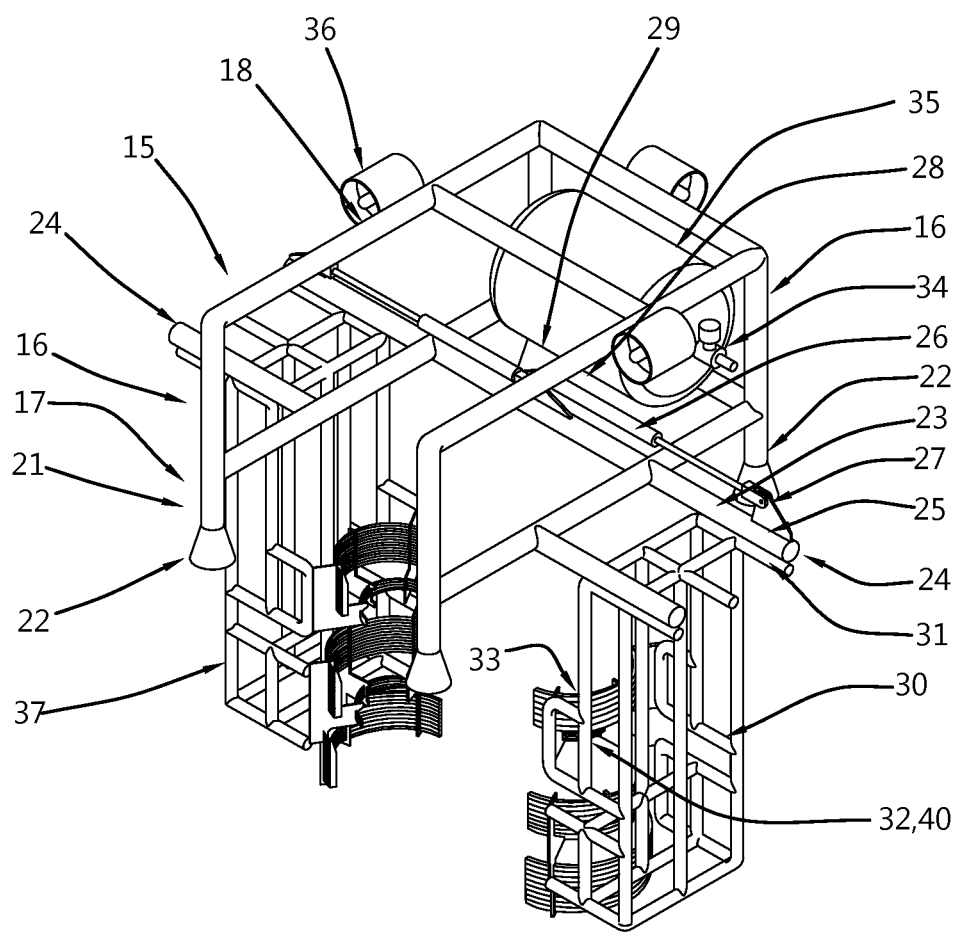
FIG. 3 shows a perspective view of a mobile freezing device, which is configured to be coupled to a drilling installation.
Figure 4:
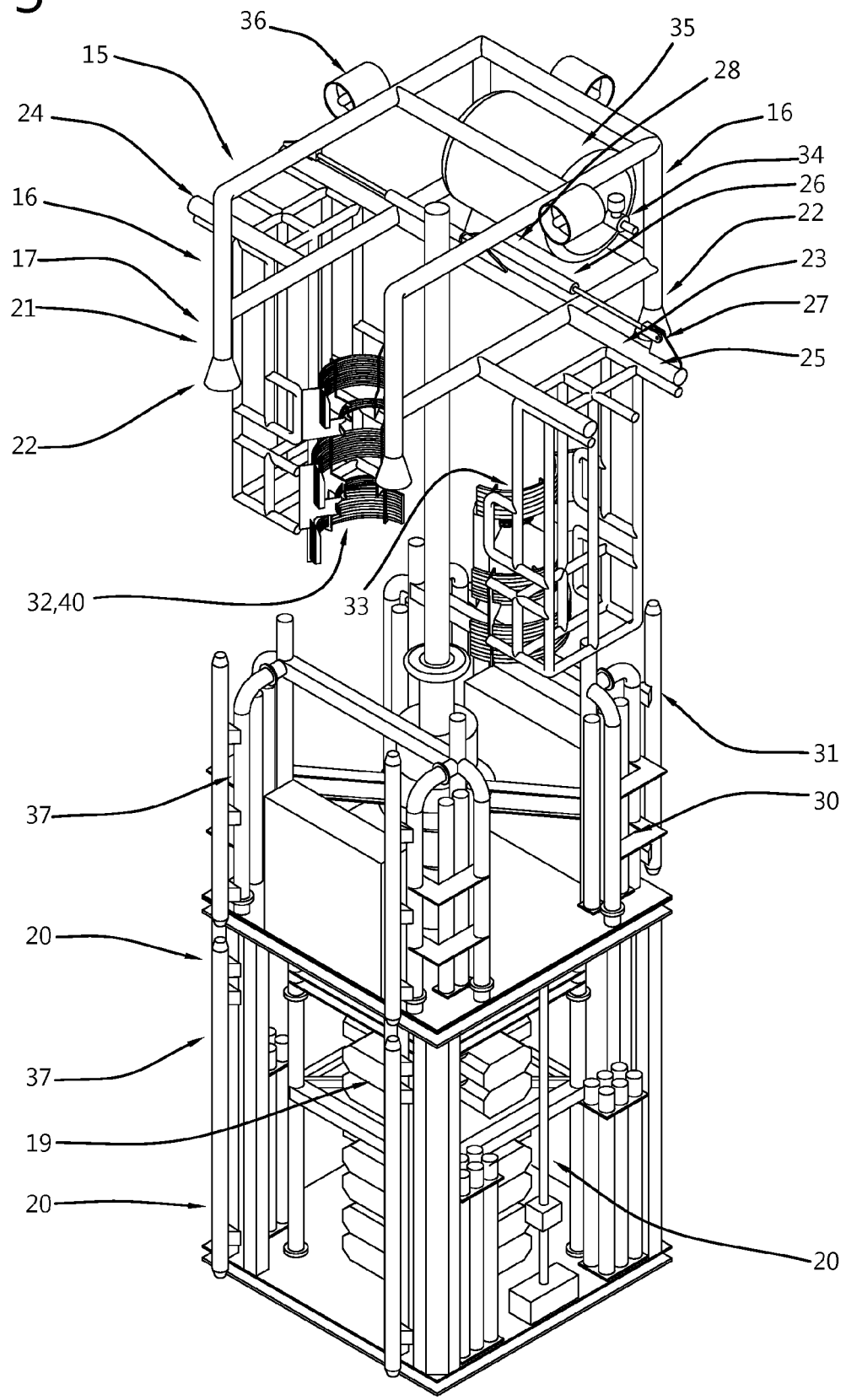
FIG. 4 shows the mobile freezing device according to FIG. 3 which is located above a drilling installation.
Figure 5:
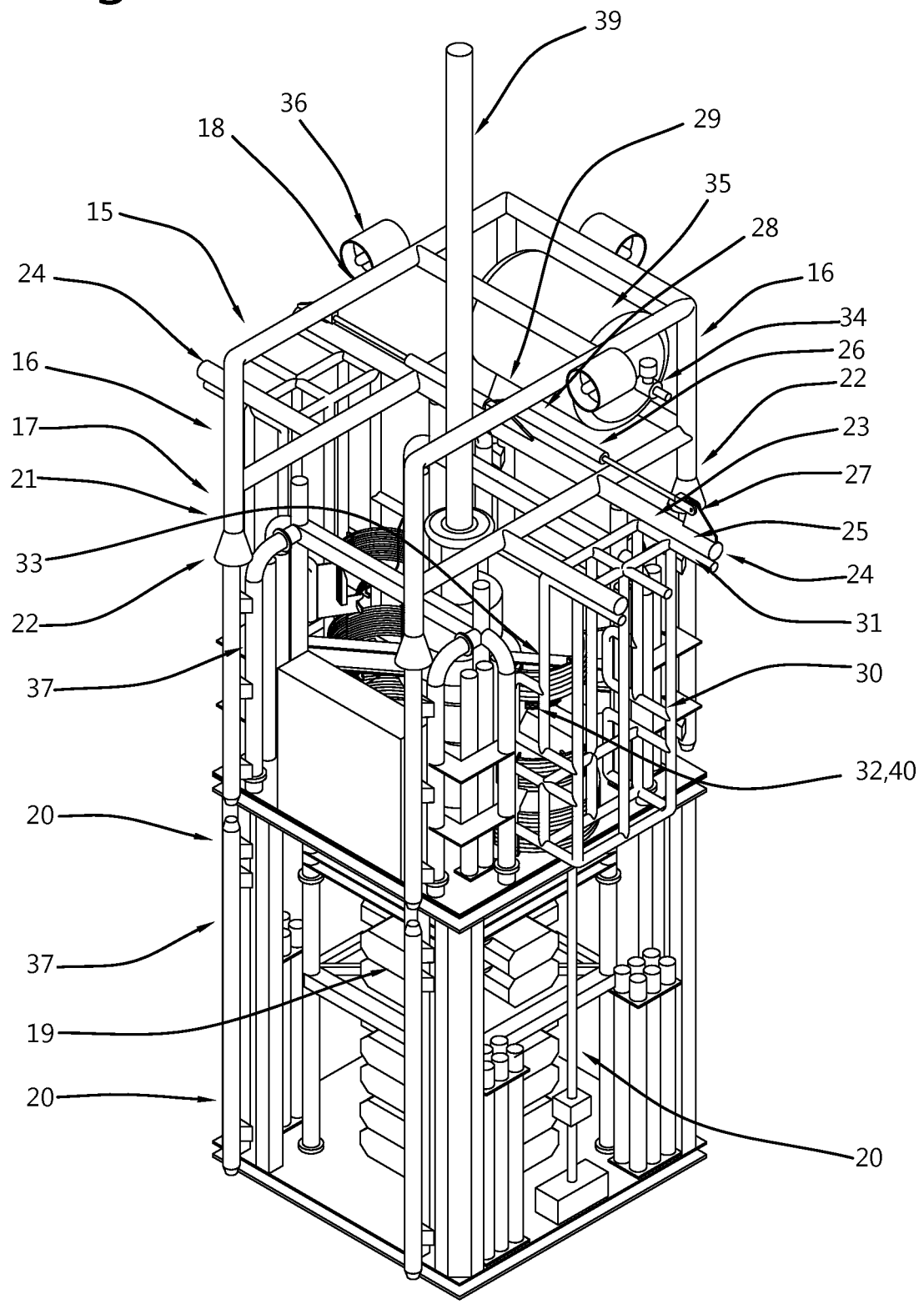
FIG. 5 shows the mobile freezing device according to FIG. 3, coupled to a drilling installation.
Figure 6:
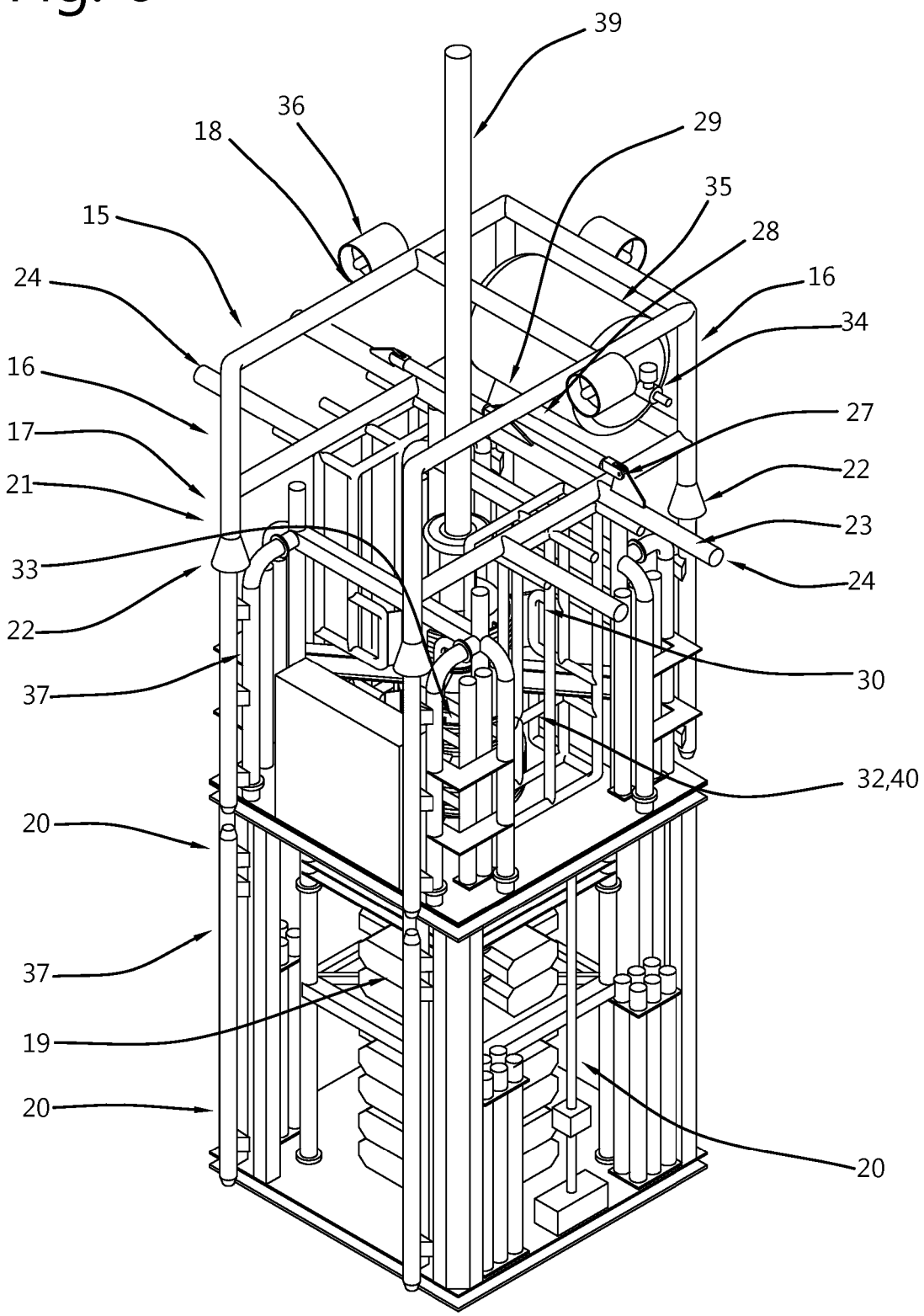
FIG. 6 shows the mobile freezing device according to FIG. 3, which is being positioned in the target position on a drilling installation by means of hydraulic cylinders.
Figure 7:
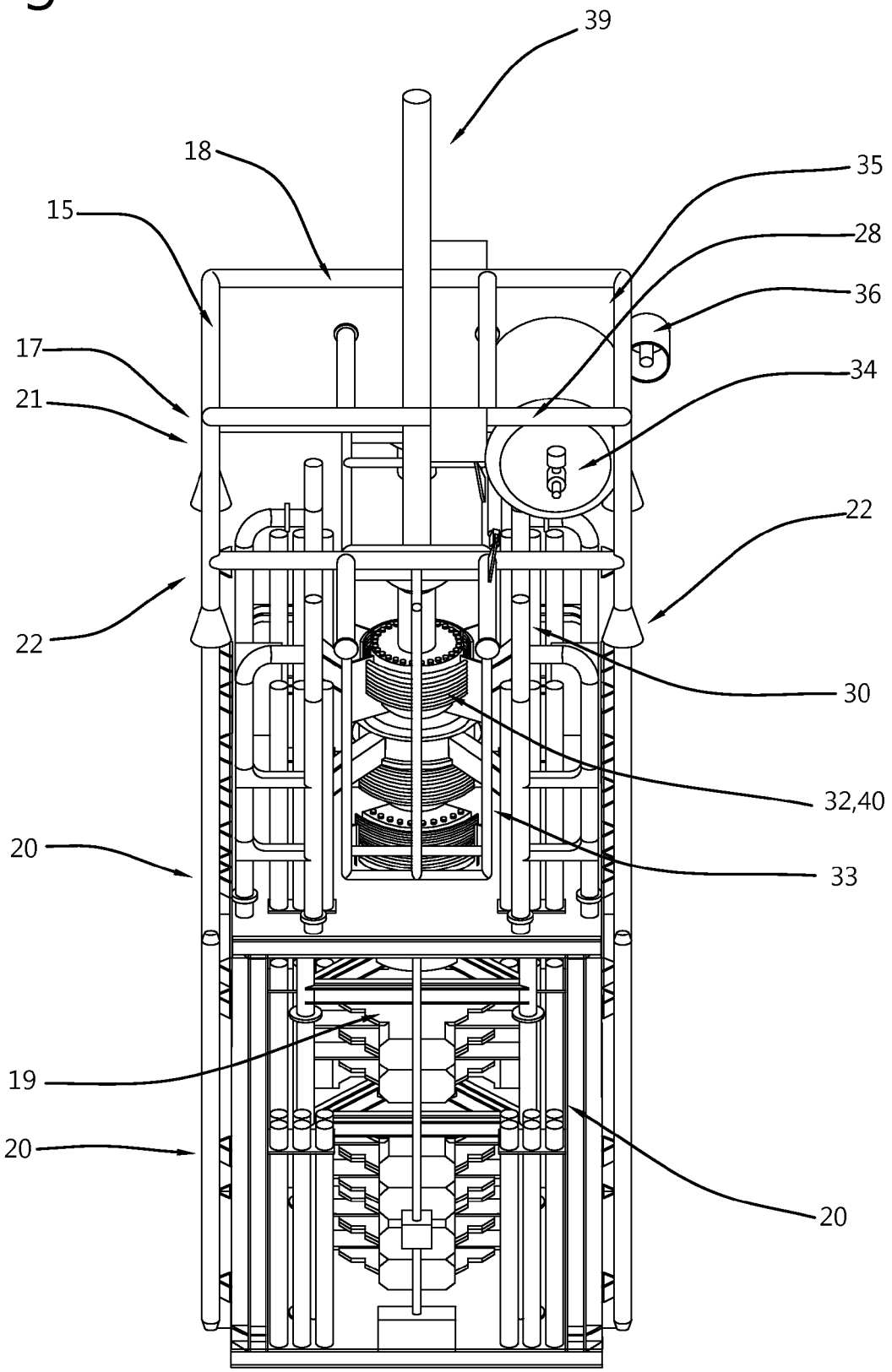
FIG. 7 and FIG. 8 show respectively a detailed view and a front view of the freezing device according to the invention, wherein the thin spirally conduits are located close to—and in engagement with—the valves.
Figure 8:
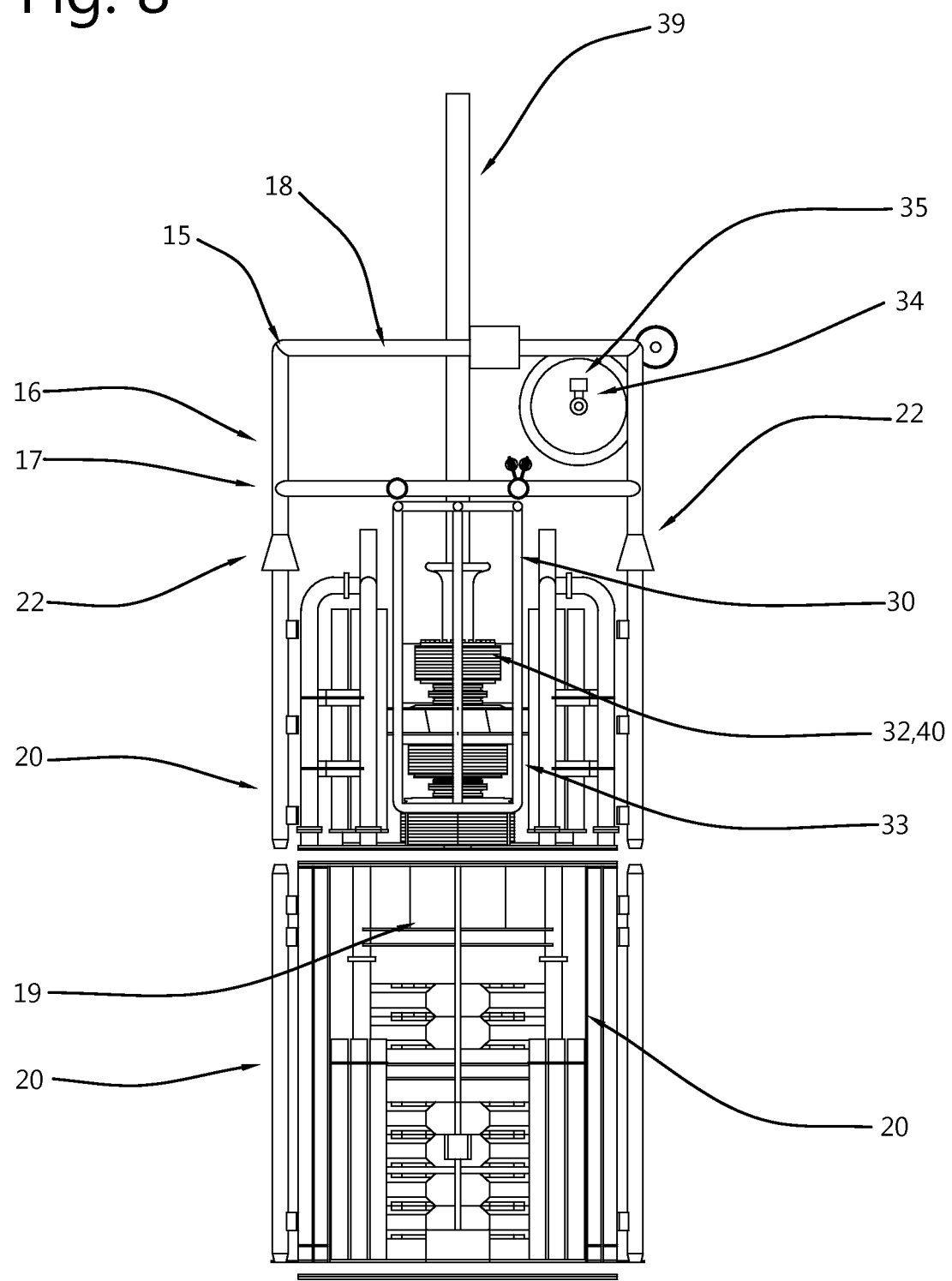

Instead of freezing a conduit and/or valve from the outside, this may also be achieved by means of a small pipe in the interior of the conduit and/or valve, as is shown in FIG. 2. In this embodiment nitrogen is injected into the conduit 11 through a side connection 10, as a result of which the medium in the conduit is frozen even faster. It is also possible to apply both embodiments in combination with one another.

For large conduits and/or valves, the freezing device can be used combining water and nitrogen. By spraying both water and nitrogen in a target space via pipes, the freezing takes place even faster, allowing large openings and/or cracks to be closed also. This embodiment can be applied with large storage tanks and/or ships. When as a result of a collision a hull of a ship is damaged, the opening in the hull can, depending on the place and size of the damage, be closed by means of the freezing device.

If desired, the freezing device according to the invention can also be provided in a mobile format allowing the freezing device to be provided at a later stage, for instance to a drilling installation at great depth which is not fitted with such a safety system.

The invention is in particular suitable to close off a non-functioning Blow Out Preventer 19 (BOP). See FIGS. 3-8. A BOP 19 is a special valve which is applied for oil/gas drilling, amongst others at a sea bed. During oil/gas drilling the drilled pipe at some point in time enters an area of the oil reservoir (or gas field). In the oil reservoir, a large pressure generally exists. Oil or gas could eject into the open in an uncontrolled manner because of the pressure, i.e. Blow Out, when a fluid connection would be made with the oil reservoir. In order to prevent this from happening, at some point in time during the drilling a BOP is installed on the oil well. The BOP is a complicated device comprising various valves. The BOP further comprises hydraulic and electric ducts and sensors for measuring various parameters such as pressure. A BOP is generally installed together with a riser pipe. After the installation of the BOP and the riser, the drilling is performed through the riser and the BOP.

The BOP closes the bore hole by means of strong hydraulic valves when a sudden rise in pressure occurs. The strong hydraulic valves are generally capable of cutting and/or pinching a drilling pipe which extends through the BOP.

In the embodiment of FIGS. 3-8, the safety device can be provided in a frame 15, of which the end 16 is carried out with long legs 17. The frame can in top view be a C-shaped frame, allowing the frame 15 to be positioned around a BOP. In order to precisely position the installation 18 over a valve 19 of a drilling installation 20 (i.e. BOP), the underside 21 of the legs 17 is provided with conical cylinders 22. At the underside, transverse to the C-frame 15, four transverse pipes 23 are mounted which protrude horizontally from the C-frame 15, and which have ends which are provided with a blind flange 24. The transverse pipes 23 are further provided with a guide 25, which is configured in such a way that it is movable back and forth in a linear fashion by means of a hydraulic cylinder 26. The back and forth movement is oriented in a substantially horizontal direction, away from the BOP and towards the BOP. On top of the guide 25, a first support 27 for the hydraulic cylinder 26 is provided which extends in the longitudinal direction of the guide 25, wherein the other end 28 of the hydraulic cylinder 26 is connected via a second support 29 to the C-frame 15. At both ends of the C-frame 15, a vertical construction 30 is provided, of which the upper end 31 is mounted to two guides 25. The vertical constructions can move back and forth relative to the frame 15 in a horizontal direction.

Halfway and at the bottom of the vertical construction 30, thin pipes 32 (or conduits) are provided which are curved in such manner that they define a dish shape. The pipes 32 extend in a zigzag manner or in another manner and form a more or less curved surface, i.e. a dish form. Further, the spirally shaped thin pipes 32 are provided with small openings 33 in a radial direction. At both ends of the spirally shaped thin pipes 32, supply pipes are provided, which are connected to closing device 34, preferably comprising a valve, of nitrogen reservoir 35 which is located in the C-frame 15. In use, liquid nitrogen is ejected from the openings 33 via the supply pipes. In order to maneuver the installation to the desired position, the upper side of the C-frame 15 is provided with thrusters 36 for positioning the installation.

When due to circumstances such as an explosion, the valve 19 at the sea bed can no longer be closed as a result of which oil or gas leaks and disappears into the sea, the mobile freezing installation 18 according to the invention can be used to stop the flow of oil. The safety device which is carried out as a portable installation 18 is lowered from a mother ship into the sea above the valve of a drilling installation 20 (i.e. BOP) via cables (not shown in the figures). By maneuvering the mobile installation exactly above the drilling installation 20 with the aid of thrusters 36, in particular the valve of the drilling installation, it is possible to lower the mobile installation 18 entirely over the drilling installation 20, and, in the shown example, place it on the drilling installation. The in top view C-shaped frame has an opening on one side, and it is moved in a horizontal direction towards the BOP with the opening directed at the BOP in such a way that the frame is placed around the BOP. In order to carry out the maneuvering with a high accuracy and to facilitate the placing of the frame on the BOP, the frame is provided with conical cylinders in the shown example. By means of the conical cylinders 22, the C-frame 15 will guide the position of the installation, also because the drilling installation 20 is provided with four vertical guides 37, of which the end 38 extends conically for cooperation with the said conical cylinders of the shown frame. During the placement of the installation on the drilling installation the conical cylinders of the frame engage the conical ends of the vertical guides of the drilling installation for the further positioning of the frame. Because the four vertical guides 37 of the drilling installation 20 and the conical cylinders 22 of the C-frame 15 are located at the same position, the maneuver is simplified.

As soon as the installation 18 is located in the correct position on the drilling installation 20, the vertical constructions 30 comprising the spirally shaped thin pipes 32 can be moved with the hydraulic cylinder 26 in a linear manner against the valve 19 and the conduit 39. Because the dish shapes that are defined by the thin pipes 32 have substantially a same contour as the valves 19 and the conduit 39 of the drilling installation 20, the dish shapes, the valve 19 and the conduit 39 of the drilling installation will just not engage one another.

By opening the valve 34 of the nitrogen reservoir 35, the cooling process is started, causing the valve 26 and the conduit 39 of the drilling installation 20 to be frozen, as a result of which eventually the leaking of the oil is stopped. This allows damage to the environment, tourism and fishery activities to remain limited which may save billions of dollars or euro's.

It is possible that additionally, liquid nitrogen and water is injected into the valve and/or conduit of the installation 20.

This is possible by using one or more connections which are provided on the installation 20, and which allow a fluid connection with the through hole which extends through the installation 20.

It is possible that additionally, a closed conduit system is provided, in order to maintain the frozen BOP in the closed condition in a later stage. The closed conduit system is preferably formed to surround the valve and the conduit of a drilling installation.

In an embodiment, the cooling parts of the closed conduit system are connected to the movable parts of the frame to which the spraying device is also mounted. In this way both freezing devices can be moved in a simple manner towards a conduit and/or valve for surrounding it and be moved away from said conduit and/or valve.

The installation 20 can be a BOP, but can also be a pipeline end terminal (PLET), an anode or another installation. In an embodiment, the installation can also be a pipeline itself. The safety system is preferably provided with a frame for carrying the spraying device and the freezing device. The spraying device is configured to spray the freezing medium around the conduit and/or the valve, and/or is configured to inject the freezing medium into the conduit and/or the valve. With the aid of the spraying device, the conduit and/or valve is cooled in order to form a closing plug in the conduit and/or valve.

In a further embodiment, the frame is further provided with a second freezing device comprising a closed cooling system, for cooling a closing plug which has been formed by the first spraying device. In the shown embodiment the closed conduits 40 have the same form as pipes 32, so as to form a curved surface together or define a dish form for surrounding the conduit which is to be cooled. The closed conduits are connected to a reservoir comprising a cooling medium, which is not shown in the figures. The cooling medium, for instance freon, is supplied from the cooling reservoir via the closed conduits 40 in order to cool the closing plug. In an alternative embodiment the closed conduits 40 are positioned separately from conduits 32, for instance at a slightly larger distance of the conduit which is to be cooled, or on movable parts of the frame which are movable independently of the parts of the frame which support conduits 32.

The frame is configured for positioning the first freezing device and, if present, the second freezing device close to the conduit and/or valve of for instance a drilling installation. This effect can be achieved by the form of the frame, wherein the freezing device or freezing devices are supported by the frame so as to enable positioning these close to the conduit and/or valve when the frame is positioned on the valve and/or conduit which is to be cooled. In a further embodiment the frame is provided with movable parts which, when the frame is placed on or around a conduit and/or valve, can move between a position at a distance from the conduit and/or valve and a position in close proximity with the conduit and/or valve. In this embodiment, a freezing device or the freezing devices are supported by the movable parts of the frame, so as to enable the movement thereof in the direction of the transport conduit and/or valve after the placing of the frame around and/or on the transport conduit and/or valve, in order to reduce the distance between the freezing device and the conduit and/or valve which is to be cooled and in order to improve the cooling.

In an embodiment, the safety device is provided with a frame which can be placed on a valve or on a conduit. In an embodiment, the frame has a C-shape when viewed in top view, so that the conduit and/or valve can be accommodated in the frame via the opening. In an alternative embodiment, the frame comprises for instance two parts which are connectable to one another when a conduit and/or valve is positioned between those two parts. In a further embodiment, the two parts are hingeably connected to one another.

The frame can for instance also comprise one central part and one or more hingable parts and/or linear moving parts which can be moved around a valve or conduit, or between which the valve and/or conduit can be positioned. The movable parts can for instance be moved in the direction of the conduit and/or valve after the central part of the frame is placed on the valve and/or conduit.

In a further embodiment, the first freezing device and/or, if present, the second freezing device, or at least the cooling parts thereof, are supported by the movable parts of the frame. By moving the movable parts toward the conduit and/or the valve, the movable part of the freezing device can be positioned at a short distance of the conduit and/or valve, in order to improve the forming and/or the maintaining of the closing plug in the conduit.

In an embodiment, the safety device is provided with a freezing device which comprises a spraying device which is configured to spray the freezing medium, for instance liquid nitrogen, around the conduit and/or the valve, in such a way that the closing plug is formed because the medium in the conduit and/or the valve freezes. The freezing device can for instance be formed as a thin conduit with nozzles for instance liquid nitrogen or a corresponding cooling medium, which can be positioned around a transport conduit and/or a valve. The thin conduit can for instance be provided on a spool, and can for instance be applied on the object which is to be cooled by divers or by a remotely controlled ROV.

In another embodiment a conduit comprising nozzles is integrated with the frame of the safety system. In another embodiment the conduit is part of a bowl-shaped element, for instance having a radius which is similar to or larger than the contour of the conduit which is to be cooled, and which can be moved at a position near the conduit with a movable arm in order to surround this conduit partially.

In a further embodiment a plurality of thin conduits are provided which can each be provided around the conduit or valve which is to be cooled.

In an exemplary embodiment the safety system is provided with a freezing device which comprises a spraying device which is configured to spray the freezing medium, for instance liquid nitrogen, in the conduit and/or valve, in such a way that the closing ice plug is formed by the freezing of the medium in the conduit and/or the valve.

The spraying device can for instance be formed as a thin conduit for instance for liquid nitrogen or a corresponding cooling medium, which can be connected to an inlet in the conduit and/or the valve, wherein the inlet is in connection with the interior space of the conduit. In a further embodiment, the conduit may be provided on a spool, and can for instance be connected to the inlet by divers of by a remotely controlled under water vehicle. In a further embodiment, the transport conduit and/or the valve is provided with one or more spraying nipples 42 on the inside, wherein the spraying nipples 42 are in connection with the inlet, such that a spraying nipple 42 or the spraying nipples 42 can be connected via the conduit which is connected to the inlet to a reservoir comprising a freezing medium. In a further embodiment, multiple conduits are provided, such that multiple inlets can be connected to the reservoir comprising freezing medium, for instance connected to an inlet on the conduit and to an inlet on the valve. In an alternative embodiment the safety device is provided with means, such as a drilling device, for making an opening in the conduit which is to be cooled, and the safety device is provided with conduits which can subsequently be positioned in said opening, or are integrated with the drilling device, for bringing the freezing medium in the conduit.

In a further exemplary embodiment the spraying device is not only configured to spray the freezing medium into the conduit and/or the valve, but also configured to spray a frost liquid having a relatively high melting point, for instance water, into the conduit and/or into the valve, in such a way that the closing plug is formed by the freezing of the frost liquid which is injected into the conduit and/or the valve. The freezing device may comprise, in addition to the above mentioned conduit for supplying the freezing medium, a further conduit for supplying and spraying the frost liquid into the conduit and/or into the valve, for instance via an inlet having one or more spraying nipples 42. The freezing device is in that case configured to spray the frost liquid and the freezing medium into the conduit and/or valve, so as to freeze the frost liquid in the conduit and/or valve and form the ice plug.

In an embodiment, the safety device is provided with one or more, possibly exchangeable, reservoirs for holding the freezing medium, and is possibly provided with reservoirs for holding the frost liquid. The freezing medium and the frost liquid can be transported with the aid of pumps and via conduits to the conduit and/or valve which is to be frozen. In an embodiment, pumps and a conduit system are provided which supply seawater as frost liquid. This embodiment does not need a reservoir for frost liquid. In an alternative embodiment, frost liquid in the form of water is supplied from tanks. This has as an advantage that the water is not contaminated by for instance oil which is leaking from the oil well, and cannot plug the pumps and/or damage the pumps.

In an embodiment, the freezing device is configured to freeze the conduit and/or the valve both from the outside and from the inside. In a further embodiment, the safety system is, in addition to the first freezing device for forming the closing ice plug, further provided with a second freezing device for maintaining the closing ice plug. This second freezing device comprises a closed conduit system for transporting a freezing medium, for instance freon, for cooling the conduit and/or valve and/or the layer of ice which is formed on the conduit and/or valve.

During the operation of such an embodiment of the safety system during a first time period the freezing medium is sprayed by the first freezing device in order to form the closing ice plug in the conduit and/of the valve. During a second time period the formed closure is cooled by the second freezing device, and maintained. During the second period the spraying of the freezing medium is halted.

In an embodiment, the freezing device comprises two or more conduit parts which are formed in such a way that they each define a dish form, wherein the dish forms are configured to, in use, be positioned around the conduit and/or the valve and to surround these at least partially. Preferably, the dish parts are formed in such a way that they can be combined into a sleeve which encircles the conduit an/or the valve. In an alternative embodiment, the conduit parts are integrated in the frame of the safety system, or are integrated with a movable part of that frame.

The ice plug which is formed by the freezing device in the conduit and/or the valve is formed by the injected water and/or by the medium which is transported by the conduit and/or the valve, such as oil, which obtains such a high viscosity that it is stuck in the conduit and/or valve.

The transport conduit and/or the valve of the safety device is provided with a spraying nipple 42 on an inner side thereof, where an end of the spraying nipple is connected to a nitrogen reservoir of the safety device.

The freezing device of the safety device is controlled by means of one or more computers 43, where the computers 43 are connected to sensors such as cameras and/or a GPS-system 44, allowing the computers 43 to determine from a safe distance after a explosion on the basis of camera images and/or data of GPS-systems 44 whether or not to switch the safety system on in order to freeze the installation.

Although the invention is described above with reference to a number of exemplary embodiments, it will be clear for the skilled person that the invention is not limited to the shown embodiments, but can be modified in varies ways within the scope of the claims.

All the embodiments can be combined with one another. The spirally shaped thin pipes can for instance be oriented vertically instead of horizontally. The round cooling pipes can for instance also have another form, such as oval.

The invention claimed is:

1. A safety device for an oil or gas installation, said installation comprising one or more conduits for the transport of oil or gas, or one or more valves, wherein the safety device comprises:
   a first freezing device for forming a closing ice plug, which first freezing device comprises a spraying device that is configured to spray a freezing medium into the conduit or into the valve; and
   a second freezing device for maintaining the closing ice plug;
   wherein the first freezing device is substantially positioned in or around the conduit or the valve;
   wherein, in operation of the safety device, the first freezing device cools the conduit or the valve to such an extent that a closing ice plug is formed in the conduit or the valve by the freezing of a medium in the conduit or the valve; and
   wherein the second freezing device comprises a closed conduit device for transporting a freezing medium, and, in operation of the safety device, during a first time period the freezing medium is sprayed by the first freezing device in order to form the closing ice plug and during a second time period the formed closure is maintained by the second freezing device, and wherein during the second period the spraying of the freezing medium is halted.

2. The safety device according to claim 1, wherein the first freezing device comprises a spraying device which is configured to spray the freezing medium around the conduit or around the valve, so as to form the closing ice plug by freezing the medium in the conduit or the valve.

3. The safety device according to claim 2, wherein the first freezing device comprises a conduit for liquid nitrogen, which is configured to be positioned around a transport conduit or a valve, wherein the thin conduit is provided with openings, which in use are directed substantially at the transport conduit or the valve.

4. The safety device according to claim 1, wherein the transport conduit or the valve is provided with a spraying nipple on an inner side thereof, wherein an end of the spraying nipple is connected to a nitrogen reservoir of the safety device.

5. The safety device according to claim 1, wherein the spraying device is not only configured to spray the freezing medium into the conduit or into the valve, but is also configured to spray a frost liquid having a relatively high melting point into the conduit or into the valve, so as to form the closing ice plug by freezing of the frost liquid which has been injected into the conduit or valve.

6. The safety device according to claim 1, wherein the second freezing device comprises two or more pipe sections which are formed so as to each define a dish shape, wherein the dish shapes are configured to, in use, be positioned about the conduit or the valve and to substantially surround the conduit or the valve.

7. The safety device according to claim 2, wherein the safety device comprises a frame for placement on or around the valve or the conduit,
wherein the frame supports the first freezing device, and
wherein the frame is configured to position the first freezing device close to the conduit or the valve, which effect is achieved by the form of the frame, or because the frame comprises movable parts which support the first freezing device and are capable of moving these in the direction of the conduit or valve after the frame is placed on or around the conduit or the valve.

8. The safety device according to claim 1, wherein the safety device is entirely integrated in an explosion resistant container.

9. The safety device according to claim 1, wherein the safety device is mobile and is constructed to be positioned substantially in or around a conduit or a valve after the occurrence of a calamity.

10. The safety device according to claim 1, wherein the first freezing device is configured to be applied on walls of storage tanks and on ships.

11. The safety device according to claim 1, wherein the first freezing device is located substantially sub-surface and the freezing medium is capable of being dispersed via webs which are located under the installation, thereby freezing the conduits or valves.

12. The safety device according to claim 1, wherein the first freezing device is controlled by means of one or more computers, wherein the computers are connected to cameras or a GPS-system, allowing the computers to determine from a safe distance after an explosion on the basis of camera images or data of GPS-systems whether or not to switch the safety system on in order to freeze the installation.

13. The safety device according to claim 7, wherein the frame furthermore supports the second freezing device, and wherein the frame is configured to position the second freezing device close to the conduit or the valve, which effect is achieved by the form of the frame, or because the frame comprises movable parts which support the second freezing device and are capable of moving these in the direction of the conduit or valve after the frame is placed on or around the conduit or the valve.

14. A method for closing a transport conduit or a valve of an oil or gas installation, by means of a safety device which comprises a first freezing device which is configured to spray a freezing medium, the method comprising:
spraying a freezing medium into the conduit or into the valve, or
spraying a freezing medium around the conduit or around the valve, and
spraying a frost liquid having a relatively high melting point into the conduit or into the valve,
wherein a closing plug is formed in the conduit or the valve, which closing plug is substantially formed by the frost liquid, and
wherein during a first time period the freezing medium and the frost liquid are sprayed for forming the closing plug and wherein during a second time period the formed closing plug is maintained by cooling the plug by means of a second freezing device which comprises a closed conduit system.

15. The method according to claim 14, wherein a combination of a freezing medium and a frost liquid is sprayed into the conduit or valve, and wherein only a freezing medium is sprayed around the conduit or valve.

16. The method according to claim 14, comprising:
utilizing the safety device according to claim 1.

17. A method for closing a transport conduit or a valve of an oil or gas installation, by means of a safety device which comprises a first freezing device which is configured to spray a freezing medium, the method comprising:
positioning the first freezing device in the vicinity of the conduit or valve after a calamity has occurred;
lowering the first freezing device from a vessel via cables to a position in proximity with the valve or the transport conduit which is to be closed,
moving the first freezing device in a substantially horizontal direction toward the transport conduit or valve, so as to place a frame of the first freezing device around the transport conduit or the valve,
spraying a freezing medium around the conduit or around the valve,
wherein a closing plug is formed in the conduit or the valve, and
wherein during a first time period the freezing medium is sprayed for forming the closing plug and wherein during a second time period the formed plug is maintained by cooling the plug by means of a second freezing device which comprises a closed conduit system.

18. The method according to claim 17, wherein the safety device comprises a frame having movable parts which support a freezing device of the safety device, the method further comprising:
after the positioning of the freezing device around or on the transport conduit or valve, moving the movable parts of the frame toward the transport conduit or valve for positioning the freezing device in proximity with the transport conduit or valve in order to enable the cooling of the transport conduit or valve, and
spraying a freezing medium around the conduit or valve.

19. The method according to claim 17, wherein the safety device comprises a spraying device which is configured to spray the freezing medium into the conduit or into the valve, and comprises a connection device for connecting the spraying device to an inlet of the transport conduit or valve, further comprising:
after the positioning of the freezing device around or on the transport conduit or valve, connecting the connecting device for the freezing medium to the inlet of the transport conduit or valve; and
spraying the freezing medium into the conduit or into the valve.

20. The method according to claim 19, wherein the spraying device is further configured to spray a frost liquid into the conduit or the valve, and comprises a connection device for connecting the spraying device to an inlet of the transport conduit or valve, the method further comprising:
after positioning the freezing device around or on the transport conduit or valve, connecting the connection device for the frost liquid to the inlet of the transport conduit or valve; and
in combination with the spraying of the freezing medium, spraying the frost liquid into the conduit or the valve.

21. The method according to claim 17, wherein the freezing device is positioned in the vicinity of a blowout preventer, wherein:
a freezing medium is sprayed around the blowout preventer, and a freezing medium is sprayed into the blowout preventer, thereby forming a closing plug in the blowout preventer.

22. A safety device for an oil or gas installation, said installation comprising one or more conduits for the transport of oil or gas, and one or more valves, wherein the safety device comprises:
   a first freezing device for forming a closing ice plug, which first freezing device comprises a spraying device which is configured to spray the freezing medium around the conduit or around the valve; and
   a second freezing device for maintaining the closing ice plug;
   a frame for placement on or around the valve or the conduit, wherein the frame supports the first freezing device, and wherein the frame is configured to position the first freezing device close to the conduit or the valve, which effect is achieved by the form of the frame, or because the frame comprises movable parts which support the first freezing device and are capable of moving these in the direction of the conduit or valve after the frame is placed on or around the conduit or the valve;
   wherein, in operation of the safety device, the first freezing device is substantially positioned around the conduit of the valve and cools the conduit or the valve to such an extent that a closing ice plug is formed by freezing of a medium in the conduit or the valve; and
   wherein the second freezing device comprises a closed conduit device for transporting a freezing medium, and, in operation of the safety device, during a first time period the freezing medium is sprayed by the first freezing device in order to form the closing ice plug and during a second time period the formed closure is maintained by the second freezing device, and wherein during the second period the spraying of the freezing medium is halted.

23. A safety device for an oil or gas installation, said installation comprising one or more conduits for the transport of oil or gas and one or more valves, wherein the safety device is entirely integrated in an explosion resistant container, the safety device comprising:
   a first freezing device for forming a closing ice plug, which first freezing device is configured to spray a freezing medium into the conduit or into the valve, or spray a freezing medium around the conduit or around the valve; and
   a second freezing device for maintaining the closing ice plug;
   wherein the first freezing device is substantially positioned in or around the conduit or the valve; wherein, in operation of the safety device, the first freezing device cools the conduit or the valve to such an extent that a closing ice plug is formed in the conduit or the valve; and
   wherein the second freezing device comprises a closed conduit device for transporting a freezing medium, and, in operation of the safety device, during a first time period the freezing medium is sprayed by the first freezing device in order to form the closing ice plug and during a second time period the formed closure is maintained by the second freezing device, and wherein during the second period the spraying of the freezing medium is halted.

24. A safety device for an oil or gas installation, said installation comprising one or more conduits for the transport of oil or gas, and one or more valves, wherein the safety device comprises:
   a first freezing device for forming a closing ice plug, which first freezing device is configured to be applied on walls of storage tanks and on ships and to spray a freezing medium into the conduit or into the valve, or spray a freezing medium around the conduit or around the valve; and
   a second freezing device for maintaining the closing ice plug;
   wherein the first freezing device is substantially positioned in or around the conduit or the valve;
   wherein, in operation of the safety device, the first freezing device cools the conduit or the valve to such an extent that a closing ice plug is formed in the conduit or the valve; and
   wherein the second freezing device comprises a closed conduit device for transporting a freezing medium, and, in operation of the safety device, during a first time period the freezing medium is sprayed by the first freezing device in order to form the closing ice plug and during a second time period the formed closure is maintained by the second freezing device, and wherein during the second period the spraying of the freezing medium is halted.

25. A safety device for an oil or gas installation, said installation comprising one or more conduits for the transport of oil or gas, and one or more valves, wherein the safety device comprises:
   a first freezing device for forming a closing ice plug, which first freezing device is configured to spray a freezing medium around the conduit or around the valve, and which first freezing device is located substantially subsurface, and the freezing medium is capable of being dispersed via webs which are located under the installation, thereby freezing the conduits or valves; and
   a second freezing device for maintaining the closing ice plug;
   wherein the first freezing device is substantially positioned in or around the conduit or the valve;
   wherein, in operation of the safety device, the first freezing device cools the conduit or the valve to such an extent that a closing ice plug is formed in the conduit or the valve; and
   wherein the second freezing device comprises a closed conduit device for transporting a freezing medium, and, in operation of the safety device, during a first time period the freezing medium is sprayed by the first freezing device in order to form the closing ice plug and during a second time period the formed closure is maintained by the second freezing device, and wherein during the second period the spraying of the freezing medium is halted.

26. A safety device for an oil or gas installation, said installation comprising one or more conduits for the transport of oil or gas, and one or more valves, wherein the safety device comprises:
   a first freezing device for forming a closing ice plug, which first freezing device is configured to spray a freezing medium into the conduit or into the valve; and
   a second freezing device for maintaining the closing ice plug;
   wherein the first freezing device is substantially positioned in or around the conduit or the valve and is controlled by means of one or more computers, wherein the computers are connected to cameras or a GPS-system, allowing the computers to determine from a safe distance after an explosion on the basis of camera images or data of GPS-systems whether or not to switch the safety system on in order to freeze the installation;

wherein, in operation of the safety device, the first freezing device cools the conduit or the valve to such an extent that a closing ice plug is formed in the conduit or the valve; and wherein the second freezing device comprises a closed conduit device for transporting a freezing medium, and, in operation of the safety device, during a first time period the freezing medium is sprayed by the first freezing device in order to form the closing ice plug and during a second time period the formed closure is maintained by the second freezing device, and wherein during the second period the spraying of the freezing medium is halted.

* * * * *